United States Patent [19]
Amini et al.

[11] Patent Number: 5,551,009
[45] Date of Patent: Aug. 27, 1996

[54] EXPANDABLE HIGH PERFORMANCE FIFO DESIGN WHICH INCLUDES MEMORY CELLS HAVING RESPECTIVE CELL MULTIPLEXORS

[75] Inventors: Nader Amini; Bechara E. Boury; Sherwood Brannon; Terence J. Lohman, all of Boca Raton, Fla.

[73] Assignee: International Business Machines Corporation, Armonk, N.Y.

[21] Appl. No.: 134,504

[22] Filed: Oct. 12, 1993

Related U.S. Application Data

[63] Continuation of Ser. No. 778,298, Oct. 15, 1991, abandoned.

[51] Int. Cl.⁶ .......................... G06F 13/00; G06F 13/04
[52] U.S. Cl. .................... 395/492; 395/851; 395/858; 370/62; 364/DIG. 1
[58] Field of Search ...................... 395/425, 575, 395/250, 400, 825, 851, 858, 492; 364/200, 900, 130, DIG. 1; 365/189.01, 230.03; 379/202; 348/230; 370/62

[56] References Cited

U.S. PATENT DOCUMENTS

| | | | |
|---|---|---|---|
| 3,675,209 | 7/1972 | Trost et al. | 395/825 |
| 4,307,447 | 12/1981 | Provanzand et al. | 364/130 |
| 4,374,428 | 2/1983 | Barnes | 395/250 |
| 4,686,698 | 8/1987 | Tompkins et al. | 348/230 |
| 4,811,296 | 3/1989 | Garde | 365/189.02 |
| 4,942,515 | 7/1990 | Marzucco et al. | 395/842 |
| 4,958,342 | 9/1990 | Williams et al. | 370/79 |
| 4,959,772 | 9/1990 | Smith et al. | 395/185.01 |
| 4,962,483 | 10/1990 | Lodhi | 365/221 |
| 5,005,158 | 4/1991 | McClure et al. | 365/200 |
| 5,036,489 | 7/1991 | Theobald | 365/73 |
| 5,127,103 | 6/1992 | Hiu et al. | 395/183.21 |

FOREIGN PATENT DOCUMENTS 90089129  3/1990  Japan.

OTHER PUBLICATIONS

Hart et al. "A dual–port FIFO memory with umlimited expansion capability", IEE 1985.

*Primary Examiner*—Tod R. Swann
*Assistant Examiner*—James Peikari
*Attorney, Agent, or Firm*—Daniel E. McConnell; Robert S. Babayi; Robert Lieber

[57] ABSTRACT

An arrangement of cells with input and output steering circuitry as well as internal shifting capabilities is disclosed which advantageously provides a first in/first out (FIFO) register circuit which can be written to and read from in contiguous clock cycles. The FIFO register circuit is provided with an arrangement of self contained FIFO cells, each cell containing its own input multiplexer and control circuitry.

15 Claims, 8 Drawing Sheets

EXPANDABLE HIGH PERFORMANCE FIFO DESIGN WHICH INCLUDES MEMORY CELLS HAVING RESPECTIVE CELL MULTIPLEXORS

CROSS-REFERENCE TO RELATED APPLICATIONS

This is a continuation of application Ser. No. 07/778,298 filed on Oct. 15, 1991, now abandoned.

This application is related to the commonly-assigned application of Bechara F. Boury, Richard G. Hofmann and Terence J. Lohman titled "Selectable Refresh in an Information Handling System" and having a Ser. No. of 08/095,489, now abandoned, the commonly-assigned application of Nader Amini, Bechara F. Boury and Terence J. Lohman titled "DMA Data Buffering Using a FIFO with Memory Backup" now U.S. Pat. No. 5,381,538; the commonly-assigned application of Nader Amini, Bechara F. Boury, Sherwood Brannon, Inn Concilio, Richard G. Hofmann and Terence J. Lohman titled "Dynamic Bus Sizing of DMA Transfers" now U.S. Pat. No. 5,172,760; the commonly-assigned application of Nader Amini, Bechara F. Boury, Sherwood Brannon, Richard G. Hofmann and Terence J. Lohman titled "Error Detection and Recovery in a DMA Controller" now U.S. Pat. No. 5,333,274, the commonly-assigned application of Bechara F. Boury, Terence J. Lohman and Long D. Nguyen titled "CPU Bus Allocation Control" now U.S. Pat. No. 5,239,631, and, the commonly assigned application of Nader Amini, Bechara F. Boury and Terence J. Lohman titled "Controlling Bus Reallocation Using Arbitration Hold", now U.S. Pat. No. 5,301,282, all of which are filed on even date herewith and are hereby incorporated by reference.

BACKGROUND OF INVENTION

The present invention relates to information handling systems, and more particularly to direct memory access of memory in personal computer systems.

Generally in computer systems and especially in personal computer systems, data are transferred between various elements such as a central processing unit (CPU), memory devices and direct memory access (DMA) control circuitry as well as expansion devices such as input/output (I/O) adapters, bus controllers (i.e., elements which can control the computer system), bus slaves (i.e., elements which are controlled by bus controllers). The expansion devices are often interconnected via a system I/O bus. The DMA control circuitry is used to transfer information to and from memory devices without using the CPU; generally, once the CPU has provided the DMA control circuitry with control information such as the base location from where information is to be moved, the address of where the data information should go, and the size of the data information to be moved, the DMA control circuitry controls the transfer of the data information.

Often it is desirable to temporarily hold data which is being transferred from one location to another. It is known to temporarily hold data by using, e.g., write back buffers, register arrays, small static memory buffers and first in, first out (FIFO) buffers. With a FIFO buffer, data are provided to the input terminals of the FIFO, temporarily held by the FIFO and provided to the output terminals of the FIFO. Characteristics which are desirable in a FIFO buffer include speed, expandability and self-containment. A FIFO buffer should be fast enough to allow back to back read and write accesses in any order without additional wait states. A FIFO buffer should be expandable to support wider buses, referred to as buffer width, as well as expandable to allow additional storage, referred to as buffer depth; it is also desirable to allow expansion without the necessity of changing the system requirements of the FIFO, i.e., without requiring changing the control information which is provided to the FIFO.

It is known to configure FIFO buffers in a plurality of arrangements. In a first arrangement, called a mux-in/mux-out arrangement, data are provided to a layer of multiplexers. The data are multiplexed until ultimately, at the output stage, a single multiplexer provides the output signal. The FIFO is widened by providing additional input signals to the existing arrangement of multiplexers. This arrangement allows immediate access to any data cell at any time; however, the output multiplexer increases substantially as additional data cells are added. Thus increasing cell count and data propagation delay.

In a second arrangement, called a shift register arrangement, data are provided to an array of shift registers and shifted down to an output stage. An additional row of shift registers is added to the arrangement to widen the FIFO. This arrangement allows adding additional data cells without adding additional output multiplexer cells or data propagation delay. However, data information which is presented to the input terminals of the FIFO cannot be immediately accessed due to the shifting process.

SUMMARY OF THE INVENTION

It has been discovered that providing an arrangement of cells with input and output steering circuitry as well as internal shifting capabilities advantageously provides a FIFO which can be written to and read from in contiguous dock cycles. It has also been discovered that providing a FIFO with an arrangement of self contained FIFO cells, each cell containing its own input multiplexer and control circuitry, advantageously provides a FIFO which can be expanded both in width and in depth. It has also been discovered that providing FIFO cells with individual multiplexer circuitry and control circuitry advantageously allows self-contained FIFO cells.

DETAILED DESCRIPTION

Figure 1:
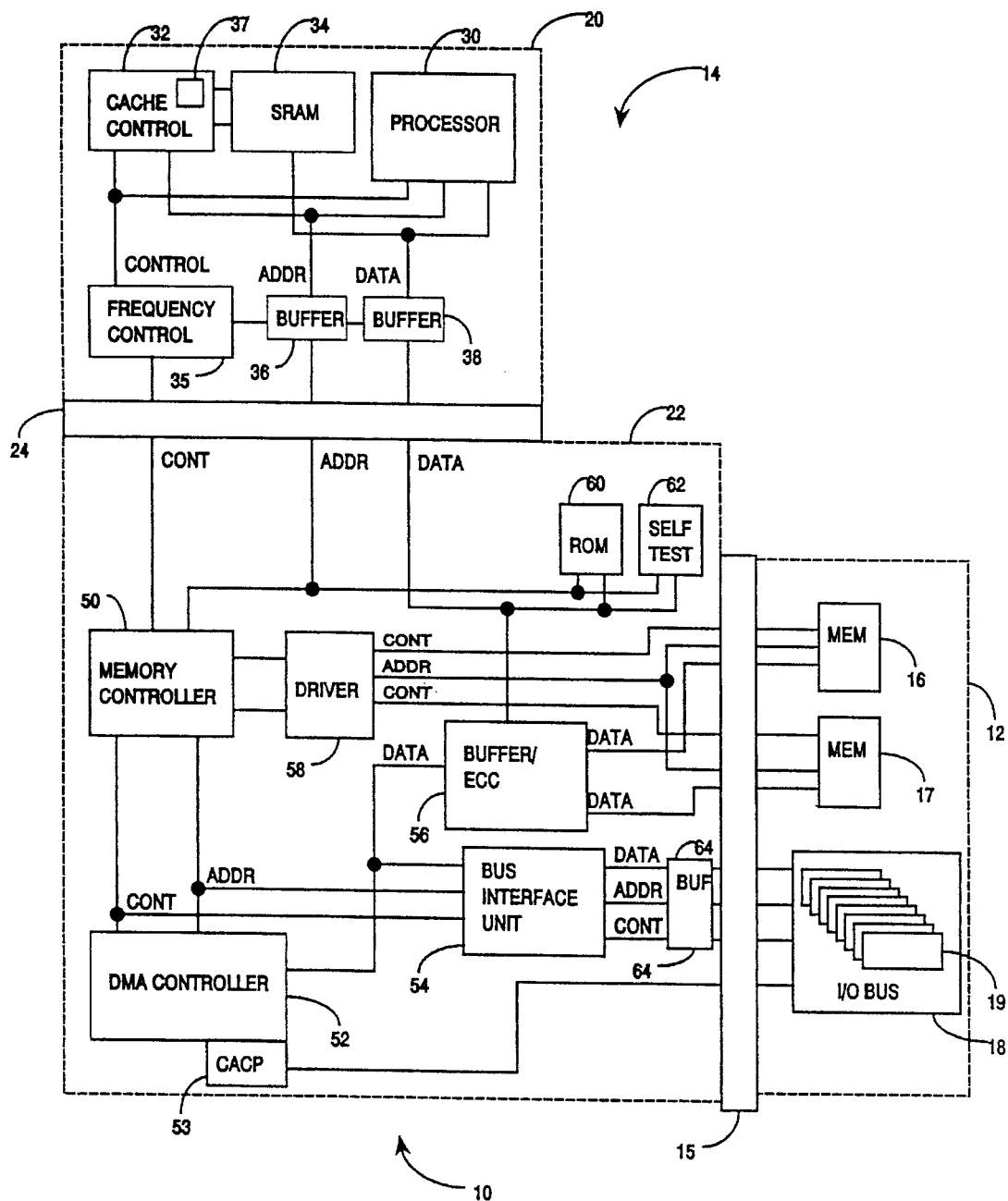
FIG. 1 is a schematic block diagram of a computer system which includes a DMA controller according to the present invention.

Referring to FIG. 1, computer system 10 includes system board (i.e., planar) 12 as well as processor complex 14.

Processor complex 14 is connected to planar 12 via processor complex connector 15. Planar 12 includes memories 16, 17 as well as input/output (I/O) bus 18, which may for example conform to the MICRO CHANNEL computer architecture. Memories 16, 17 are arranged as an interleaved system memory. Expansion devices 19 may be connected to computer 10 via I/O bus 18. Planar 12 may also include conventional video circuitry, timing circuitry, keyboard control circuitry and interrupt circuitry (all not shown) which are used by computer 10 during normal operation.

Processor complex 14 includes processor portion 20 and base portion 22. Processor portion 20 is connected to base portion 22 via local bus connector 24. Processor portion 20 operates at 50 MHz and base portion 22 operates at 40 MHz.

Processor portion 20 includes microprocessor 30 (e.g., available from Intel, Inc. under the trade designation 486), cache control module 32, memory 34 (e.g., static random access memory (SRAM)), and frequency control module 35 as well as address buffer 36 and data buffer 38. A data information path is provided between microprocessor 30, memory 34 and data buffer 38. An address information path is provided between microprocessor 30, cache control circuit 32 and address buffer 36. A control information path is provided between microprocessor 30, cache control module 32 and frequency control module 35. Additionally, an address information path and a control information path are provided between cache control module 32 and memory 34. The data, address and control information paths represent a processor bus.

Memory 34 provides a cache function by storing in short term memory information from either memories 16, 17 or from memory which is located on an expansion device 19. Cache control module 32 includes tag random access memory (RAM) 37 which stores the address of memories 16, 17 to which the information which is stored in memory 34 corresponds.

Frequency control module 35 synchronizes the 50 MHz processor portion with the 40 MHz base portion; frequency control module 35 also controls buffers 36, 38. Accordingly, frequency control module 35 determines when information is captured by buffers 36, 38 and when information that is stored in buffers 36, 38 is overwritten. Buffers 36, 38 are configured to allow two writes from memories 16, 17 to be stored in buffers 36, 38 simultaneously. Buffers 36, 38 are bidirectional, i.e., buffers 36, 38 can latch information which is provided by processor portion 20 and information which is provided to processor portion 20. Because buffers 36, 38 are bidirectional, processor portion 20 may be replaced or upgraded while maintaining a standard base portion 22.

Base portion 22 includes memory controller 50, direct memory access (DMA) controller 52, central arbitration control point (CACP) circuit 53, bus interface unit 54 and buffer/error correction code (ECC) circuit 56. Base portion 22 also includes driver circuit 58, read only memory (ROM) 60, self test circuit 62 and buffer circuit 64. A control information path is provided between memory controller 50 and frequency control module 35 of processor portion 20. Control information paths are also provided between: memory controller 50, DMA controller 52 and bus interface unit 54; memory controller 50 and driver 58; driver 58 and memories 16, 17; bus interface unit 54 and buffer 64; buffer 64 and I/O bus 18 of planar 12; and, CACP 53 and I/O bus 18 of planar 12. An address information path is provided between memory controller 50, ROM 60 and self test circuit 62 as well as address buffer 36 of processor portion 20. Address information paths are also provided between: memory controller 50, DMA controller 52 and bus interface unit 54; memory controller 50 and driver 58; driver 58 and memories 16, 17; bus interface unit 54 and buffer 64; and, buffer 64 and I/O bus 18 of planar 12. A data information path is provided between buffer/ECC circuit 56, ROM 60, and self test circuit 62 as well as data buffer 38 of processor portion 20. Data information paths are also provided between: buffer/ECC circuit 56, DMA controller 52 and bus interface unit 54; buffer/ECC circuit 56 and memory 16; buffer/ECC circuit 56 and memory 17; bus interface unit 54 and buffer 64; and, buffer 64 and I/O bus 18 of planar 12.

Memory controller 50 analyzes address information which is received from processor portion 20 to determine if this information corresponds to an address of memories 16, 17 or to an address of memory which is on an expansion device 19 (i.e., expansion memory). If the address information corresponds to an address of memories 16, 17, then memory controller 50 initiates a planar memory cycle to memories 16, 17. The address which is provided to memories 16, 17 during a planar memory cycle is based upon the address which is provided by processor portion 20; however, because memory controller 50, and memories 16, 17 know their location with reference to a much larger address spectrum, the address which is provided to memories 16, 17 need only be 10-bits wide compared to the 32-bit wide address which is provided by processor portion 20. While the planar memory cycle is occurring, memory controller 50 allows either DMA controller 52, or a bus master expansion device 19 to access information via I/O bus 18.

If the address information corresponds to an expansion memory address, then memory controller 50 initiates an expansion memory cycle with the expansion memory. During an expansion memory cycle, the address which is provided to memory controller 50 is provided via bus interface unit 54 to I/O bus 18. The expansion device which includes the memory to which the address corresponds receives the memory address from I/O bus 18. If the data is being retrieved from the expansion memory, the data information which is stored in the expansion memory is provided to processor portion 20 via I/O bus 18, buffer circuit 64, bus interface unit 54 and buffer/ECC circuit 56. If the data is being written to the expansion memory, the data information is provided to the expansion memory via bus interface unit 54 and I/O bus 18. Also, DMA controller 52 controls interchanging information between memories 16, 17 and memory which is on an expansion device 19.

DMA controller 52 provides three functions for processor complex 14. DMA controller 52 utilizes a small computer subsystem control block (SCB) architecture to configure DMA channels, thus avoiding the necessity of using programmed I/O to configure DMA channels. DMA controller 52 also provides a buffering function to optimize transfers between slow expansion devices and fast memory devices. DMA controller 52 also provides an eight channel, 32-bit data, address and byte transfer count direct memory access function. When providing the DMA function, DMA controller 52 may function in two modes. In a first mode, DMA controller 52 functions in a programmed I/O mode in which DMA controller 52 is functionally an I/O slave. In a second mode, DMA controller 52 functions as a DMA bus master, in which DMA controller 52 arbitrates for and controls I/O bus 18. During this second mode, DMA controller 52 uses a first in, first out (FIFO) register circuit; data from a source is passed through the FIFO register circuit prior to being provided to a destination. Accordingly, a serial DMA operation is performed.

CACP 53 functions as the arbiter for computer system 10. CACP 53 receives arbitration control signals from DMA controller 52 as well as expansion devices 19 and controls, by provided arbitration control information, which device may transfer information via I/O bus 18 and for how long a particular device may control (i.e., own) I/O bus 18.

Bus interface unit 54 provides the bi-directional interface between the architecture of processor complex 14 and the architecture of I/O bus 18. Bus interface unit 54 also provides a buffering function to optimize the interface between the two architectures. Bus interface unit 54 also provides a bus sizing function. I.e., bus interface unit 54 can receive information in 32-bit wide segments and provide the information to I/O bus 18 in smaller segments depending on the requirements of the expansion device 19 with which processor complex 14 is communicating.

Buffer/ECC circuit 56 provides a data path between processor portion 20 and memories 16, 17, a data path between memories 16, 17 and DMA controller 52 and bus controller 54. Buffer/ECC circuit 56 also provides a data path between processor portion 20 and DMA controller 52 and bus interface circuit 54. Buffer/ECC circuit 56 checks for errors via error correction code; additionally, buffer/ECC circuit 56 is capable of operating with and supporting parity memory for downward compatibility with planars 12 which include parity memory.

Driver circuit 58 provides control information and address information from memory controller 50 to memories 16, 17. Driver circuit 58 drives this information based upon the number of single in-line memory modules (SIMMs) which are used to provide memories 16, 17. I.e., driver circuit 58 varies the signal intensity of the control and address information which is provided to memories 16, 17 based upon the size of memories 16, 17. The size of memories 16, 17 is determined by software during an initialization of computer 10.

Buffer circuit 64 provides isolation between base portion 22 and planar 12. Buffer circuit 64 uses buffers which allow buffer circuit 64 to capture boundary information between I/O bus 18 and bus interface unit 54 in real time; i.e., the buffers store the information as it appears at connector 15. Accordingly, if computer 10 experiences a failure condition, buffer circuit 64 may be accessed by a computer repair person to determine the information which was present at connector 15 upon failure of computer 10.

Self test circuit 62, which is connected to a plurality of locations within base portion 22, provides a plurality of self test features. Self test circuit 62 accesses buffer circuit 64 to determine if failure conditions exist. Self test circuit 62 also tests the other major components of base portion 22 upon power-on to determine whether computer 10 is ready for operation.

Figure 2:
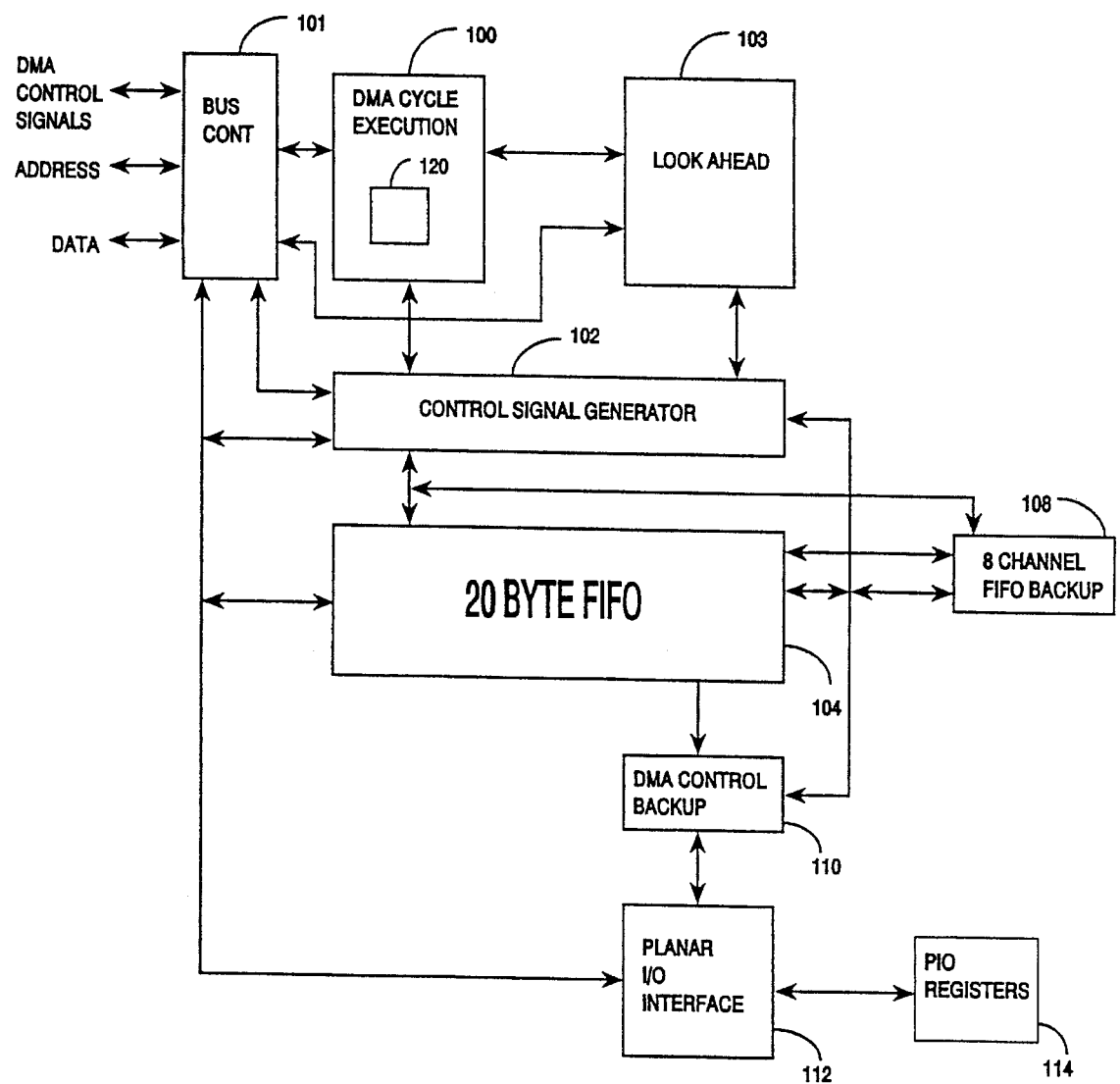
FIG. 2 is a schematic block diagram of a DMA controller according to the present invention.

Referring to FIG. 2, DMA controller 52 includes DMA cycle execution circuit 100, bus control circuit 101, control signal generator circuit 102, look ahead circuit 103, first in, first out (FIFO) register circuit 104, FIFO register backup circuit 108, DMA control backup circuit 110, planar I/O interface circuit 112 and program/input/output (PIO) register circuit 114. The combination of cycle execution circuit 100, control signal generator circuit 102, look ahead circuit 103 and DMA backup controller 110 function as DMA control circuitry.

DMA cycle execution circuit 100, which includes DMA control state machine 120, functions as the overall controller of DMA controller 52. I.e., DMA cycle execution circuit 100 orchestrates the operation of DMA controller 52 by providing high level control information. DMA cycle execution circuit 100 provides control information to control signal generator circuit 102 and receives count information from control signal generator circuit 102. DMA cycle execution circuit 100 also provides information to and receives information from look ahead circuit 103 and DMA control backup circuit 110. DMA cycle execution circuit 100 also provides, via bus control circuit 101, DMA control signals to and receives DMA control signals from the control information path between memory controller 50, DMA controller 52 and bus interface unit 54 of base portion 22.

Bus control circuit 101 functions as the interface between DMA controller 52 and any circuits which communicate with DMA controller 52. Bus control circuit 101 includes the circuitry which is necessary for receiving external signals and providing these signals to the appropriate circuit of DMA controller 52. Bus control circuit 101 also includes the necessary logic to transmit signals which are generated by circuits of DMA controller 52.

Control signal generator circuit 102 is the functional, basic controller of DMA controller 52. I.e., control signal generator 102 generates individual control signals based upon the high level control information which is received from DMA cycle execution circuit 100. Control signal generator circuit 102 provides information to and receives information from FIFO register circuit 104 as well as look ahead circuit 103. Control signal generator circuit 102 also provides information to and receives information from DMA control backup circuit 110. Control signal generator circuit 102 also provides, via bus control circuit 101, address signals to the address information path between memory controller 50, DMA controller 52 and bus interface unit 54 of base portion 22.

Look ahead circuit 103 performs a dynamic bus sizing function. Look ahead circuit 103 generates control information for a plurality of bus sizes (e.g., 8-bit, 16-bit and 32-bit wide buses) as soon as a bus cycle begins. The control information includes input variables for state machine 120 of DMA cycle execution circuit 100 as well as byte enable signals, FIFO control signals, address control signals, count control signals and data control signals for control signal generator circuit 102. By continuously generating this information, look ahead circuit 103 allows DMA controller to switch on the fly between different bus sizes during every bus cycle. By generating the control information in parallel, look ahead circuit 103 allows DMA controller 52 to run memory or I/O transfers with no additional wait states. E.g., a memory packet transfer requires only six clock cycles and an I/O or single memory transfer requires only three clock cycles.

Look ahead circuit 103 also generates the control information necessary for the initial transfer of a bus cycle. Accordingly, look ahead circuit 103 also allows DMA controller to perform zero wait state packet transfers to system memory 16, 17.

FIFO register circuit 104, which is a 20-byte FIFO, performs a holding function for DMA controller 52. FIFO register circuit 104 allows for accumulating data so that the memory portion of a transfer can be aligned on a 16-byte packet boundary, thus allowing memory transfers to occur in 16-byte packet transfers. Packet transfers allow one address to be provided for a plurality of data bytes (e.g., one address for four 32-bit words). By providing a 20-byte FIFO, the chances of finding a packet boundary of a 16-byte packet are increased. FIFO register circuit 104, via bus control circuit 101, provides data information to and receives data information from the data information path between DMA controller 52, bus interface unit 54 and buffer/ECC circuit 56.

FIFO register circuit 104 also provides data information to and receives data information from FIFO backup circuit 108 as well as providing control information to DMA control backup circuit 110.

FIFO register circuit 104 is also used to load subsystem control blocks (SCB's) of data; each SCB is 16 bytes in length. The SCB's are stored in DMA control backup circuit 110 when DMA controller 52 is functioning in the bus master mode. Accordingly, DMA controller 52 can configure a DMA channel in one 16 byte packet transfer compared to programming a DMA channel using the PIO interface and individual I/O cycles. By using DMA controller 52 to configure the DMA channels, processor 30 is not required.

FIFO backup circuit 108 performs a channel backup function for DMA controller 52. FIFO backup circuit 108 is an eight channel backup circuit; each channel being capable of storing 20 bytes of data as well as 29 FIFO state control bits. By providing a backup memory which is the same width as FIFO register circuit 104, all of the information which is stored in FIFO register circuit 104 at any given time can be backed up and stored in a single memory clock cycle. By using FIFO backup circuit 108, DMA controller 52 has the ability to store information between DMA grant cycles. This information is called residual information. Accordingly, when a particular DMA channel regains control of I/O bus 18, clock cycles are saved as it is not necessary to retrieve the information from memory. The information is transferred between FIFO backup circuit 108 and FIFO register circuit 104 in parallel.

DMA control backup circuit 110 is an 8-channel storage device which stores control information provided by control signal generator circuit 102 and provides control information to control signal generator circuit 102. DMA control backup circuit 110 provides backup programming information to and receives backup programming information from planar I/O interface circuit 112 during PIO operations. DMA control backup circuit 110 also receives control information from and provides control information to bus controller 101 via FIFO register circuit 104 during SCB fetches.

Planar I/O interface circuit 112 controls transferring and storing information in PIO registers 114 as well as DMA control backup 110. Planar I/O interface circuit provides PIO programming information to and receives PIO programming information from PIO registers 114.

PIO registers 114 store program information which is used during the operation of DMA controller 52. PIO registers include eight channels, corresponding to the eight channels of DMA controller 52. Each channel stores control information for a corresponding channel of DMA controller 52.

Figure 3:
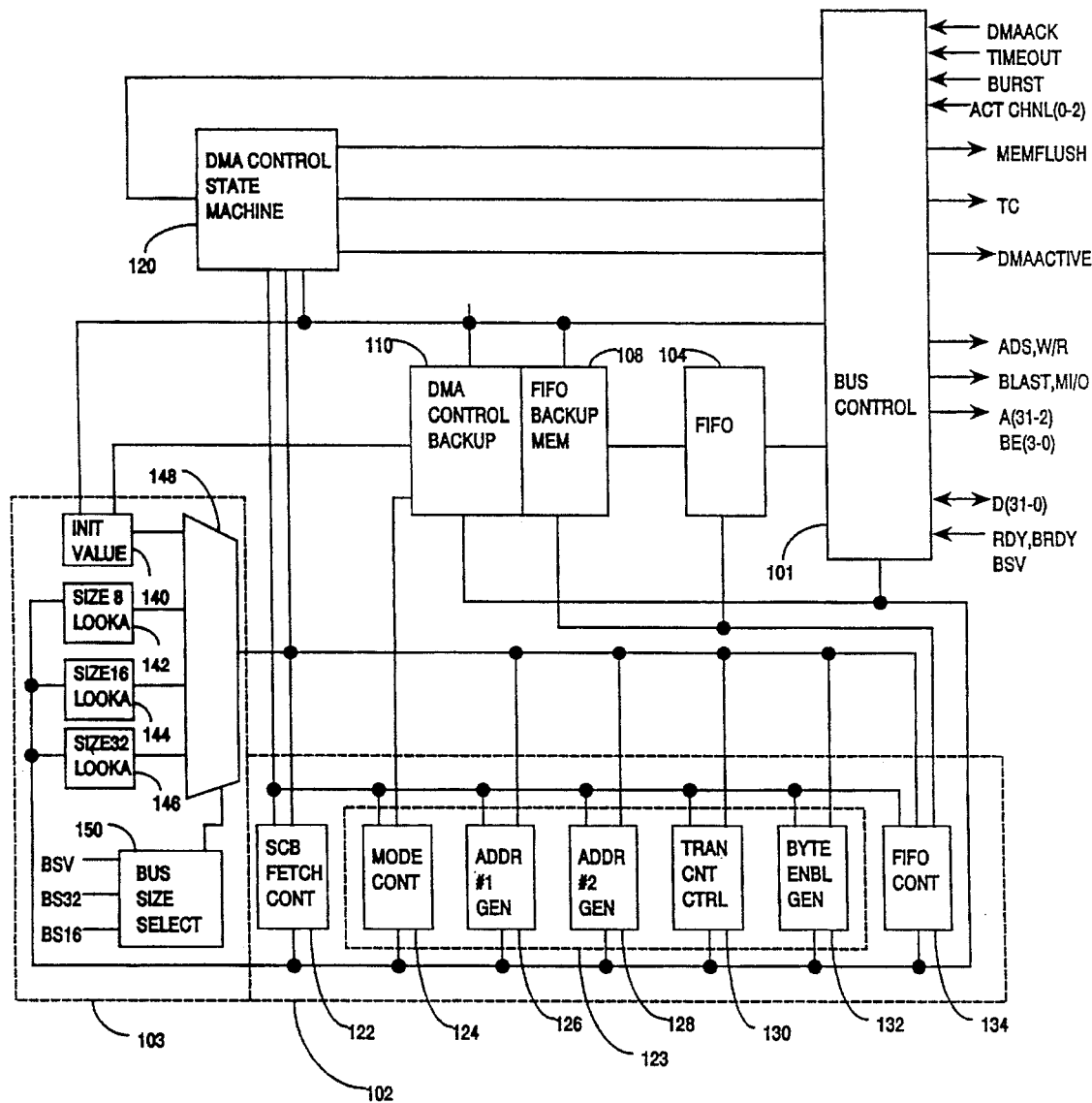
FIG. 3 is a schematic block diagram of a portion of the FIG. 2 DMA controller.

Referring to FIG. 3, bus control circuit 101 receives and provides a 32-bit data signal (D0-31), a 30 bit address signal (A2-31) and a four bit byte enable signal (BE0-3) as well as receiving a data ready signal (RDY) and a burst data ready signal (BRDY). Bus control circuit also receives DMA control signals, DMAACK, TIMEOUT, BURST and ACT CHNL(0-2). The DMAACK signal is a DMA acknowledge signal which indicates that DMA controller 52 has control of bus 18, the TIMEOUT signal is an error indication signal which indicates that DMA controller 52 should terminate transferring information, the BURST signal is provided by external devices to indicate that they are capable of sending or receiving more than one data transfer in a row, and the ACT CHNL(0-2) signal is a DMA channel active indication signal which indicates which channel of DMA controller 52 is active. Bus control circuit 101 transmits a burst last signal (BLAST), which is provided by DMA controller 52 to indicate that it intends to provide a packet transfer, an address strobe signal (ADS), which indicates when to sample address and control information, a write/read signal (W/R), which indicates whether a read or a write operation is to take place and a memory I/O signal (M/IO), which indicates whether a memory or I/O device is being accessed. Bus control circuit 101 also transmits DMA control signals MEMFLUSH, TC and DMAACTIVE. The MEMFLUSH signal indicates that remaining operations for a channel of DMA controller 52 are only memory write operations. The TC signal is a terminal count signal which is provided at the end of the last I/O cycle. The DMAACTIVE signal is a DMA active signal which stays active as long as DMA controller 52 is active (i.e., performing a transfer). Bus control circuit 101 also receives a bus size valid signal (BSV) and bus size indication signals (BS16, BS32). Information which is received by bus control circuit 101 is provided to DMA control state machine 120, DMA control backup circuit 110, FIFO backup memory 108 and FIFO register circuit 104. Information is also provided to and received from look ahead circuit 103 and control signal generator circuit 102.

Control signal generator circuit 102 includes SCB fetch controller 122; DMA transfer controller 123 which includes mode controller 124, first address generator 126, second address generator 128, transfer count controller 130, and byte enable generator 132; and, FIFO controller 134. SCB fetch controller 122 and FIFO controller 134 are control circuits of control signal generator circuit 102. Mode controller 124, first address generator 126, second address generator 128, transfer count controller 130 and byte enable generator 132 are also control circuits of control signal generator circuit 102.

SCB fetch controller 122 determines whether an SCB transfer should transpire. If so, then SCB fetch controller 122 initiates and completes an SCB transfer to DMA control backup circuit 110 via FIFO register circuit 104. Once the SCB transfer is completed, SCB fetch controller 122 provides a control signal to DMA control state machine which indicates that DMA transfers may be initiated. Once DMA controller 52 has been configured for a transfer, it is not necessary to reconfigure DMA controller 52 until the transfer is completed. SCB fetch controller 122 also allows chaining of a plurality of data blocks, thus allowing non-contiguous data blocks of information to be chained together.

DMA transfer controller 123 generates DMA transfer signals which are necessary to effectuate a DMA transfer. DMA transfer controller 123 generates these signals based upon control signals which are received from DMA control state machine. More specifically, the control circuits of DMA transfer controller 123 generate these DMA transfer signals Mode controller 124 of DMA transfer controller 123 interprets mode information which is stored in DMA control backup circuit 110 and provides control information to DMA control state machine 120 of DMA cycle execution circuit 100 based upon the mode information. Examples of different modes in which DMA controller 52 may function include I/O to memory transfers, memory to I/O transfers, and memory to memory transfers; for each of these modes, different operations may be performed by control circuits of control signal generator circuit 102 under control of DMA control state machine 120. Mode controller 124 also sets forth other aspects of a DMA transfer, e.g., whether FIFO register circuit 104 is required and thus should be enabled for a particular DMA transfer.

First address generator 126 and second address generator 128 of DMA transfer controller 123 generate address signals which represent a source address and a destination address for a DMA transfer. If the transfer is to or from an I/O device, then the first address generator remains constant. If the transfer is a memory to memory transfer, then both address signals are generated continuously during the transfer. First address generator 126 and second address generator 128 generate the address signals under control of DMA control state machine 120. First address generator 126 may generate either the source or the destination address; second address generator 128 generates the address which was not generated by first address generator 126.

Transfer count controller 130 generates transfer control information based upon the size of the block of information which is transferred during a particular transfer. When a transfer is initiated, transfer count controller 130 is loaded with control information indicating the size of the block of information which is to be transferred. This information is decremented with each byte that is transferred; when the transfer count equals zero, transfer count controller 130 provides a transfer count signal to DMA control state machine 120 which indicates that the transfer is complete.

Byte enable generator 132 generates the necessary byte enable signals at the beginning of each cycle, thus indicating which bytes to transfer during a particular DMA transfer. Byte enable generator 132 also generates byte enable signals which are provided to FIFO controller 134, thus allowing FIFO controller 134 to determine in which locations of FIFO register circuit 104 valid data information is stored.

FIFO controller 134 includes circuitry which generates FIFO control signals which are used to move bytes of data information into the stack of FIFO register circuit 104. The control signals also produce a count of how many bytes of information have been loaded into FIFO register circuit 104. This count information is used to determine how full FIFO register circuit 104 is to determine when to transition between states. FIFO control information which is generated by FIFO controller 134 is also provided to FIFO backup memory 108.

Look ahead circuit 103 includes initial value circuit 140, size-8 look ahead circuit 142, size-16 look ahead circuit 144, size-32 look ahead circuit 146 which all provide control information to multiplexer circuit 148 as well as bus size select circuit 150 which provides a control input signal to multiplexer circuit 148. Initial value circuit 140 generates the control information necessary for the initial transfer of a bus cycle; in generating the initial transfer information, initial value circuit 140 assumes the widest transfer size, i.e., 32-bit wide transfers. Size-8 look ahead circuit 142, size-16 look ahead circuit 144 and size-32 look ahead circuit 146 generate in parallel the sets of control information necessary for transfers of information based on the respective bus size. Multiplexer circuit 148 passes one of these sets of control information as a next set of control information based upon the present cycle's bus size under control of bus size select circuit 150. Bus size select circuit 150 receives the BSV, BS32 and BS16 signals, which indicate the bus size necessary for data information transfer, from bus controller 101 and selects the appropriate control information to pass for the next cycle based upon these signals. Because control information for each bus size is generated in parallel, as soon as a bus size is selected, the control information for this bus size may immediately be provided to control signal generator circuit 102 for generating the control information for the next cycle, thus decreasing latency between consecutive DMA bus cycles. Bus sizes may vary because expansion devices 19 transfer information in different bus sizes. Accordingly, DMA controller 52 may transfer information at a first bus size during a first cycle and at a second bus size during a second subsequent cycle. Thus, DMA controller 52 is capable of transferring data between system devices without any prior knowledge of their respective bus widths and with no reduction in system performance.

The output signal of multiplexer circuit 148 is provided to the control circuits of control signal generator circuit 102 and to DMA control state machine 120. These control circuits also provide and receive signals from DMA control state machine 120 and provide control signals to size-8 look ahead circuit 142, size-16 look ahead circuit 144 and size-32 look ahead circuit 146.

Figure 4:
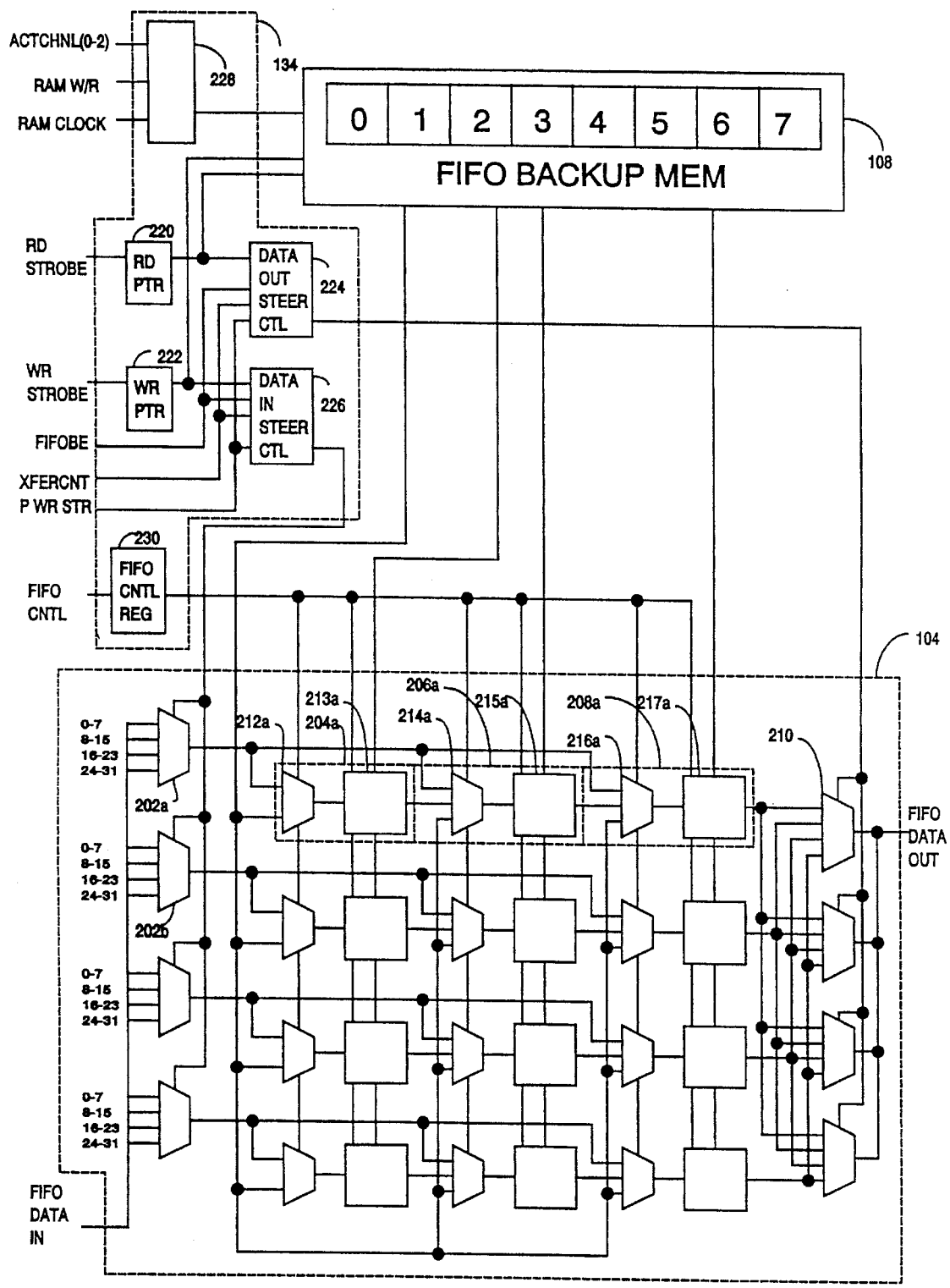
FIG. 4 is a schematic block diagram of the FIFO circuits of the DMA controller of FIGS. 2 and 3.

Referring to FIGS. 3 and 4, FIFO portion of DMA controller 52 includes FIFO buffer 104, FIFO backup memory 108 and FIFO controller 134 of control signal generator circuit 102. FIFO controller 134 of control signal generator circuit 102 provides control signals to FIFO buffer 104 and FIFO backup memory 108. FIFO backup memory 108 provides data information to FIFO buffer 104 in parallel and receives data information from FIFO buffer 104 in parallel. Accordingly, data information can be transferred between FIFO backup memory 108 and FIFO buffer 104 in a single memory cycle. Transfers of data occur under control of FIFO controller 134.

FIFO buffer circuit 104 includes input steering multiplexers 202, a plurality of buffer cells (e.g., final stage cells 204, intermediate stage cells 206 and initial stage cells 208) and output steering multiplexers 210. The buffer cells are arranged in rows (i.e., banks) and columns, each row consisting of a final stage cell 204, one or more intermediate stage cells 206, and an initial stage cell 208 and each column consisting of a plurality of final stage cells 204, intermediate stage cells 206 or initial stage cells 208. For a 20-byte FIFO register circuit, FIFO register circuit 104 includes three columns of intermediate cells as well as four rows of cells.

Input steering multiplexers 202 receive the 32-bit data signal from bus controller 101. Each multiplexer 202 provides eight bits of the data signal to a respective row of buffer cells, i.e., a respective final stage cell 204, a respective intermediate stage cell 206 and a respective initial stage cell 208 in parallel under control of FIFO controller 134. Final stage cells 204, intermediate stage cells 206 and initial stage cells 208 also receive data information in parallel from FIFO backup memory 108. Each final stage cell 204 provides a data information signal to a respective intermediate stage cell 206; each intermediate stage cell 206 provides a data information signal to another intermediate stage cell 206 or a respective initial stage cell 208. Initial stage cells 208 provide data information signals in parallel to output steering multiplexers 210 which combine the signals which are received from initial stage cells 208 to provide a 32-bit data signal to bus controller 101.

Each final stage cell 204 includes final stage cell multiplexer 212 and final stage cell control circuit 213. Each intermediate stage cell 206 includes intermediate stage cell multiplexer 214 and intermediate stage cell control circuit 215. Each initial stage cell includes initial stage cell multiplexer 216 and initial stage cell control circuit 217. The only difference between final stage cell multiplexer 212 and intermediate stage cell multiplexer 214 or initial stage cell multiplexer 216 is final stage cell multiplexer is a 2:1 mux whereas intermediate stage cell multiplexer 214 and initial stage cell multiplexer 216 are 3:1 muxes. Cell multiplexers 212, 214 and 216 all receive a data input signal from backup memory 108. All of the multiplexers 212, 214, 216 of a row of buffer cells also receive in parallel a data input signal from a respective input steering multiplexer 202. Intermediate cell multiplexer 214 also receives a data o information signal from final stage control circuit 213; initial stage multiplexer 216 receives a data information signal from intermediate stage control circuit 215. Cell multiplexers 212, 214 and 216 select which input signal to pass under control of FIFO controller 134.

FIFO controller 134 includes read pointer 220, write pointer 222, data in steer controller 226 and data out steer controller 224 as well as backup memory control circuit 228 and FIFO control signal register circuit 230. Read pointer 220 receives a read strobe signal (RD STR) and generates read pointer signals, which are provided to data out steer controller 224 and FIFO backup memory 108. Write pointer 222 receives a write strobe signal (WR STR) and generates write pointer signals, which are provided to data in steer controller 226 and FIFO backup memory 108. Data out steer controller 224 and data in steer controller 226 also receive a FIFO byte enable signal (FIFOBE), a transfer count signal (XFERCNT), and a parallel write strobe signal (P WR STR). Data in steer controller 226 controls input steering multiplexers 202 based upon these signals and data out steer multiplexer 224 controls output steering multiplexers 210 based upon these signals. Backup memory control circuit 228 receives a 3-bit active channel indication signal (ACT CHNL(0-2)), a memory read or write signal (RAM W/R) and a memory clock signal (RAM CLK). FIFO control signal register circuit 230 receives a plurality of FIFO control signals and provides control signals to FIFO register circuit 104.

Figure 5:
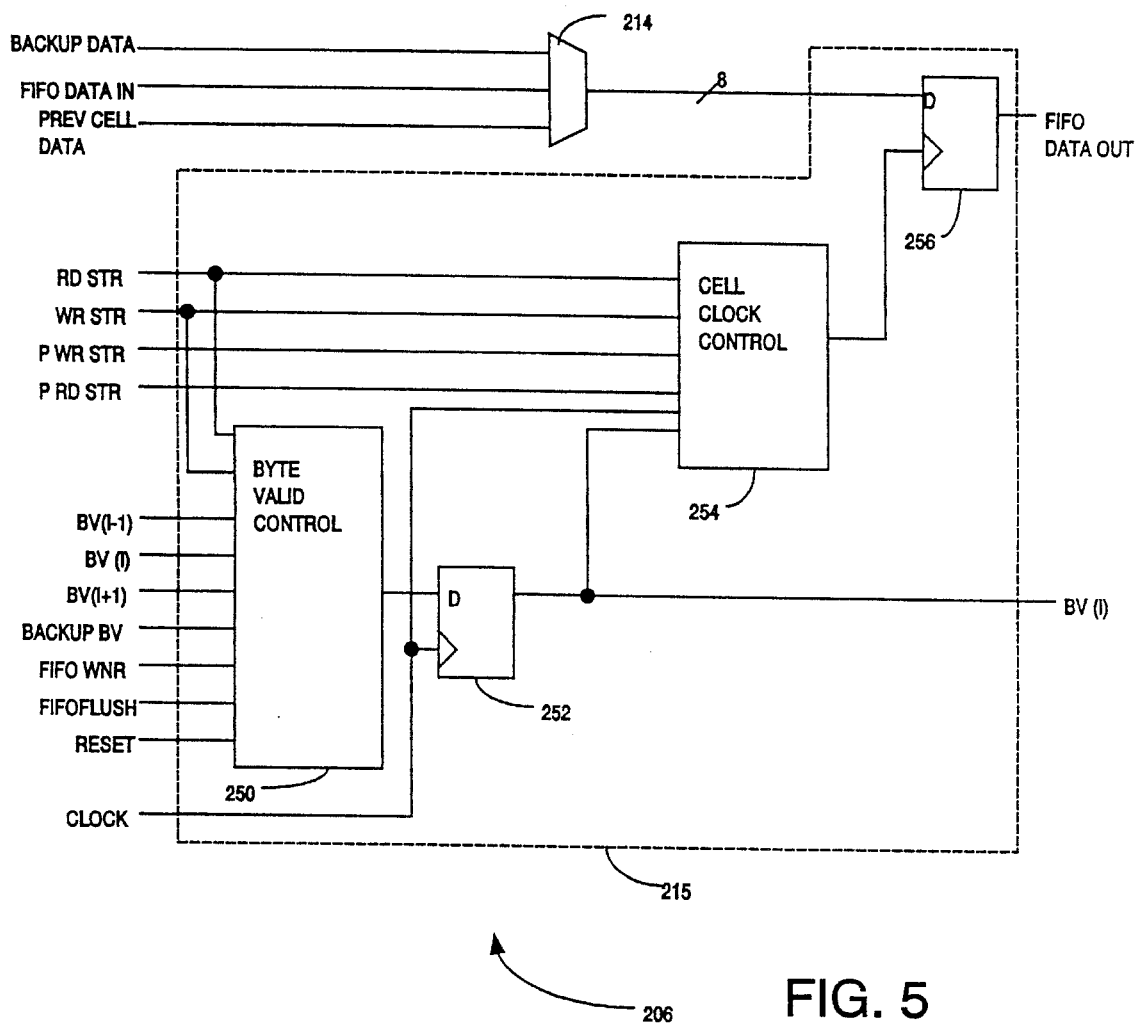
FIG. 5 is a schematic block diagram of a buffer circuit of a FIFO register circuit of the FIG. 4 FIFO circuits.
Figure 6:
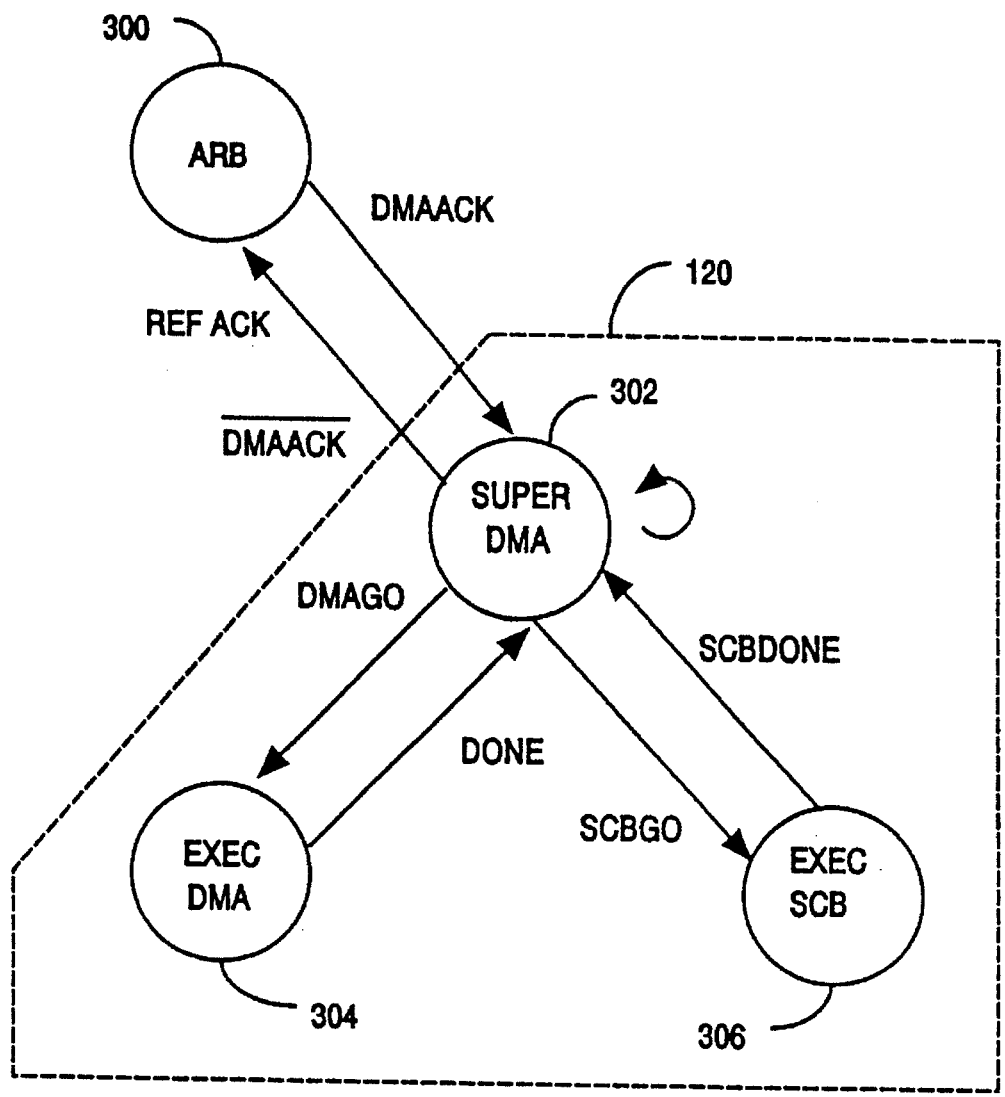
FIG. 6 is a state diagram of a high level state machine which is used in the operation of the DMA controller of FIGS. 2 and 3.

Referring to FIG. 5, intermediate stage cell control circuit 215 includes byte valid control circuit 250, byte valid flip flop 252, cell clock control circuit 254 and cell data register 256. Byte valid control circuit 250 determines whether a byte is to be stored by intermediate stage cell 206 based upon a plurality of control signals. Byte valid control circuit 250 indicates that a byte of data should be valid following the next clock cycle. Byte valid flip flop 252 synchronizes the output of byte valid control circuit 250 with the CLOCK signal, and then provides the BYTE VALID signal to cell clock control circuit 254, byte valid control circuit 250 and other neighboring cell control circuits 250. Cell clock control circuit 254 synchronizes the BYTE VALID signal with an appropriate strobe signal based upon the type of operation which is being performed by the buffer cell. The synchronized BYTE VALID signal is the clock gating input to flip flop 256 which synchronizes the FIFO data output signal based upon the input from multiplexer 214.

Byte valid control circuit 250 receives the WR STR and RD STR signals as well as byte valid signals (BV(I−1), BV(I) and BV(I=1)). BV(I−1) is the BYTE VALID signal from a previous respective stage of FIFO register circuit 104 (i.e., the BYTE VALID signal from final stage cell 204); BV(I+1) is the BYTE VALID signal from a subsequent respective stage of FIFO register circuit 104 (i.e., the BYTE VALID signal from initial stage 208 or from a subsequent intermediate state 206). Byte valid control circuit 250 also receives byte control signals backup byte valid (BACKUP BYTE VALID), which is the BYTE VALID signal which corresponds the data information which is stored in FIFO backup memory 108, FIFO write not read (FIFO WNR), which indicated whether to write data information to or read data information from FIFO register circuit 104, FIFO flush (FIFOFLUSH), which indicates when to clear the buffer cells after the information in the cells is backed up in FIFO backup memory 108, and a system reset signal (RESET), which resets all of the information of the FIFO circuits. Byte valid control circuit 250 provides a byte valid signal to flip flop 252 which is clocked by a cell clock signal (CLOCK). Flip flop 252 provides the clocked BYTE VALID signal to cell clock control circuit 254.

Cell clock control circuit 254 also receives the cell clock signals RD STR, WR STR, P RD STR and P WR STR as well as the CLOCK signal. Cell clock control circuit 254 provides a clocked BYTE VALID signal to the clock input terminal of flip flop 256, which receives the data output signal from intermediate stage cell multiplexer 214.

Referring to FIGS. 1–3 and 6, in operation, CACP 53 performs an arbitration function under control of arbitration state machine 300. If during arbitration, DMA controller 52 wins ownership of bus 18, then the DMAACK signal is activated by CACP 53 and control shifts to supervisory state machine 302 of DMA control state machine 120, which also includes execution state machine 304. Supervisory state machine 302 performs initialization functions after which control is provided to execution state machine 304 as indicated by an active DMAGO signal. Execution state machine 304 controls the actual transfer of direct memory access information. After a transfer is complete, as indicated by an active DONE signal, control is transferred back to supervisory state machine 302, which performs completion functions, after which control is passed back to arbitration state machine 300, as indicated by an inactive DMAACK signal and another arbitration cycle is initiated.

Figure 7:
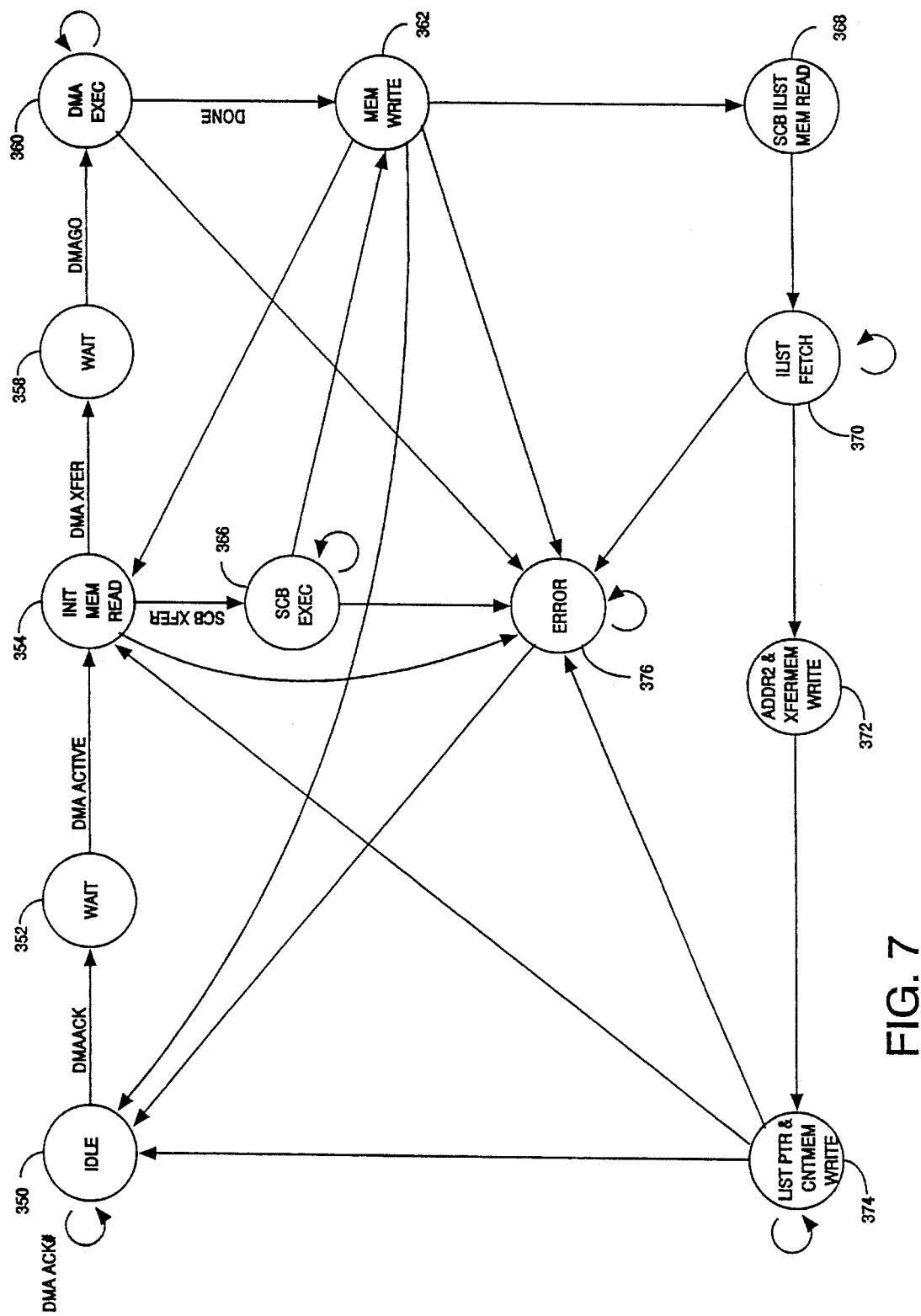
FIG. 7 is a state diagram of a supervisory state machine of the FIG. 6 state machine.

Referring to FIG. 7, supervisory state machine 302 cycles in idle state 350 until the DMAACK signal is activated. When the DMAACK signal is received, control is passed to wait state 352 which activates the DMA ACTIVE signal and allows control signals to settle prior to transfer to read memory state 354. Read memory state 354 fetches and reads DMA and SCB control information from DMA control backup circuit 110 and provides this information to control signal generator circuit 102. More specifically, the control information is loaded into mode controller 124, address generators 126, 128, transfer count controller 130 and byte enable generator 132. Additionally, FIFO information which is stored in FIFO backup memory 108 is loaded into FIFO register circuit 104 and FIFO controller 134. During read memory state 354, information which is stored in SCB controller 122 determines what type of transfer information is loaded into control signal generator circuit 102, e.g., whether a DMA transfer is to occur or whether an SCB transfer is to occur.

For a DMA transfer, control is passed to wait state 358 which activates the DMAGO signal. When the DMAGO signal is activated, control is passed to DMA execution state 360, via which control is passed to execution state machine 304. When DMA execution state machine 304 completes the transfer, the DONE signal is activated, control is returned to supervisory state machine 302, and control is passed to write state 362. Write state 362 stores the control information which is in the control circuits of control signal generator circuit 102 in DMA control backup circuit 110. Also, in write state 362, data information is transferred from FIFO register circuit 104 to FIFO backup memory 108. Additionally, in write state 362, the DMA ACTIVE signal is set inactive, which causes arbitration circuit 53 to set the DMAACK signal inactive and control is returned to idle state 350. Control remains with idle state 350 until the DMAACK signal is again activated by CACP 53.

For an SCB transfer, the control information, including an SCB pointer, is loaded from DMA control backup circuit 110 into control signal generator circuit 102 during initial memory read state 354. Control is passed from read state 354 to SCB execution state 366. During SCB execution state 366, SCB programming information is retrieved from system memory. SCB fetch controller 122 provides a fetch count which is used in retrieving the SCB information. SCB execution state 366 uses look ahead circuit 103 to generate pertinent control information based upon all possible bus sizes so that the SCB information may be retrieved as soon as the BSV signal goes active. The SCB information is placed temporarily in FIFO register circuit 104. After retrieving the information from SCB controller 122, control is passed to write state 362, where the SCB programming information is stored in DMA control backup circuit 110. After the SCB information is stored in DMA control backup circuit 110, control passes to memory read state 354 to initiate a DMA transfer. The SCB information which is retrieved is 16-bytes wide: four bytes indicating the mode of a transfer; four bytes indicating a first address (the first address is the I/O address for transfers which use an I/O device 19 or is the first memory address for memory to memory transfers); four bytes indicating a second address; and four bytes indicating a transfer count.

Supervisory state machine 302 is also capable of controlling data chaining operations. A data chaining operation is indicated by part of the mode information of the initial 16-byte SCB which is loaded during SCB execution state 366. Direct memory access transfers require data information to be stored in contiguous memory locations. Accordingly, if information is stored in noncontiguous blocks, then data chaining is used to effectuate a scatter or gather direct memory access transfer.

For data chaining operations, supervisory state machine 302 retrieves indirect list (ILIST) information in addition to the initial 16-byte SCB. The ILIST is a group of 8-byte ILIST SCB's; each ILIST SCB includes a four byte second address and a four byte transfer count. When a data chaining operation is indicated in the mode information of the SCB which is retrieved during SCB execution state 366, then after this SCB is written to memory during write state 362, control is transferred to SCB ILIST memory read state 368 during which the control information necessary to retrieve the ILIST information is loaded into control signal generator circuit 102. After this information is loaded, control is transferred to ILIST fetch state 370 during which the ILIST information is retrieved from system memory and placed temporarily in FIFO register circuit 104.

Control is then passed to write state 372 where the ILIST information is written to DMA control backup circuit 110. Control is then passed to write state 374 in which the ILIST pointer and the ILIST counter are stored in DMA control backup circuit 110. The ILIST pointer and counter are used to track which ILIST SCB of a particular data chain is to be used for the next DMA transfer. Control is then returned to idle state 350 if no DMA transfer is to occur or, if DMA controller 52 still has ownership of bus 18, control is passed to memory read state 354 to initiate a DMA transfer.

In addition to the operation states of supervisory state machine 302, supervisory state machine 302 also includes error state 376. Control transfers from certain operation states, e.g., memory read state 354, to error state 376 upon certain error conditions. A timeout condition is an example of an error state. Error state 376 performs certain completion tasks prior to returning to idle state 350, thus allowing DMA controller 52 to exit gracefully from error conditions. I.e., during error state 376, the contents of the control circuits of control signal generator circuit 102 are provided to memory, thus allowing this information to be recovered during a subsequent cycle.

Figure 8:
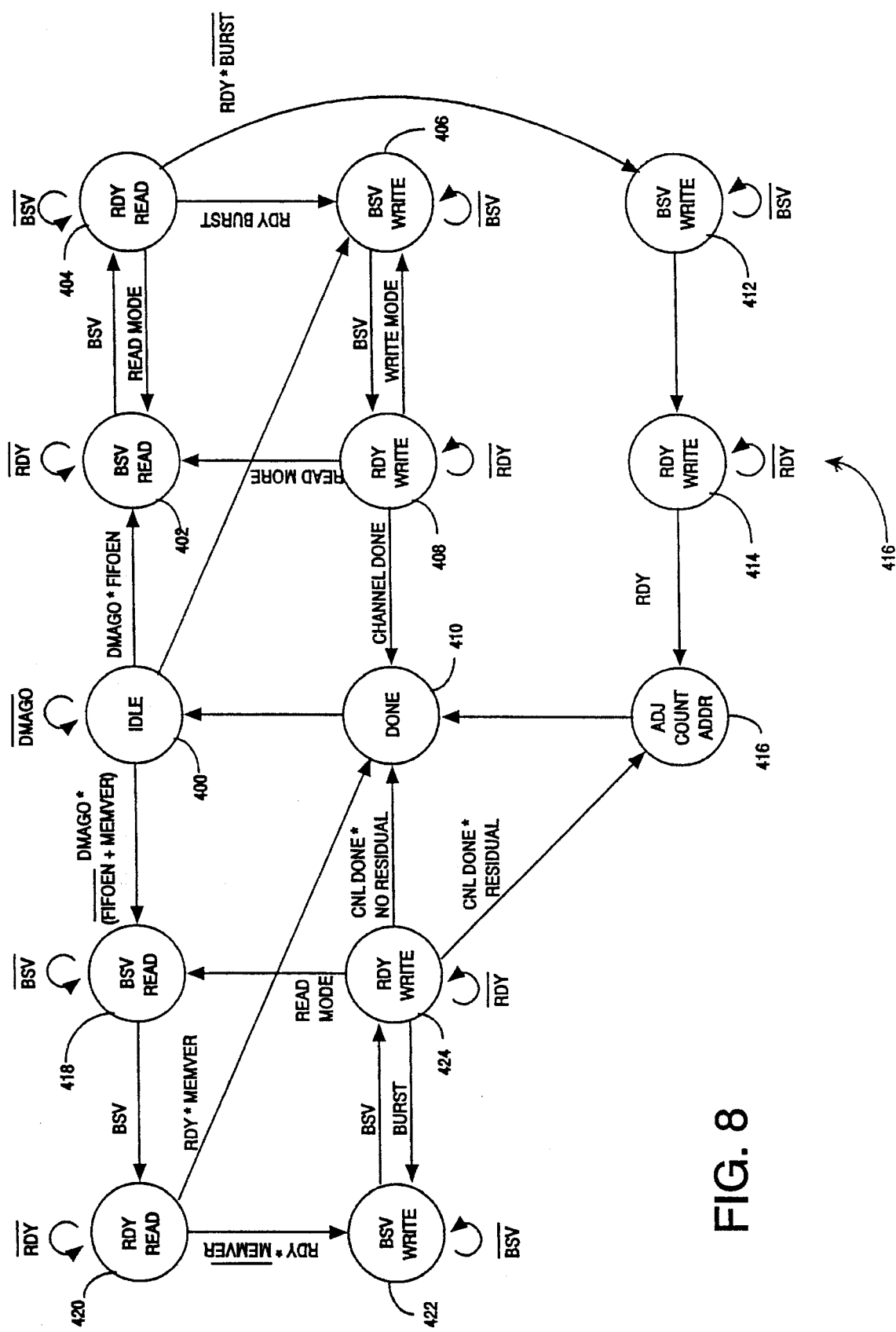
FIG. 8 is a state diagram of an executory state machine of the FIG. 6 state machine.

Referring to FIG. 8, DMA execution state machine 304 is organized in two portions, to the fight of idle state 400 is a FIFO enabled portion and to the left of idle state 400 is a FIFO disabled portion. During operation of both portions, FIFO register circuit 104 is used as a holding mechanism. However, when operation of DMA execution state machine 304 is via the FIFO enabled portion, FIFO register circuit is filled with data information, e.g., when FIFO register circuit 104 is used with burst transfers or to optimize transfers between I/O devices 19 and the system memory. The operation of the different states of DMA execution state machine 304 also depends on the mode of the DMA transfer.

Prior to passing control to execution state machine 304, it remains in idle state 400. As long as the DMAGO signal remains inactive, control remains with idle state 400. When the DMAGO signal goes active, then control passes to either the FIFO enabled portion of DMA execution state machine 304 or to the FIFO disabled portion of DMA execution state machine 304 depending on the state of the FIFOEN signal. When the DMAGO signal is active, in conjunction with an active FIFOEN signal, control is passed to bus size valid read state 402.

For an I/O to memory transfer, as indicated by the mode information which is stored in mode controller 124, data information is read from the I/O device at the beginning of the cycle. While waiting for the BSV signal to go active, look ahead circuits 142, 144, 146 of look ahead circuit 103 are receiving information from the control circuits of control signal generator circuit 102 and generating control information which will be provided to the control circuits of control signal generator circuit 102 and execution state machine 304 based upon the width of the expansion devices as indicated by the BS16 and BS32 signals. When the BSV signal goes active, the control circuits of control signal generator circuit 102 are updated and control is passed to ready read state 404.

Control remains in ready read state 404 until the RDY signal goes active. When the RDY signal goes active, data information is latched from bus 18 into bus controller 101. One clock cycle later, this data information is provided to FIFO register circuit 104 and bus controller 101 is ready to latch more data information. During ready read state 404, the look ahead signals which are being generated by look ahead circuit 103 are monitored to determine whether any more data information is to be read. If more data is to be read, then control is returned to BSV read state 402 and the process is repeated. If there is no more data information to be read, then, for an I/O to memory transfer, control is passed to bus size valid write state 406.

During bus size valid write state 406, control information regarding the bus size is provided to the control information path of base portion 22. Bus size valid write state 406 assumes a 32-bit wide path and positions data from FIFO register circuit 104 to be provided to the data information path of base portion 22 in 32-bit segments unless FIFO register circuit 104 contains less than four bytes or the memory address is not aligned on a double word boundary. When the BSV signal goes active, control is passed to ready write state 408; when the RDY signal goes active, the data information is written out of FIFO register circuit 104 to memory in a burst. During ready write state 408, the look ahead signals which are being generated by look ahead circuit 103 are monitored to determine whether any more data information is to be written. If more data is to be written, then control is returned to BSV write state 406 and the process is repeated. Data information is written until FIFO register circuit 104 does not contain enough data to effectuate a transfer.

If after the data information is written from FIFO register circuit 104 and DMA controller 52 still owns bus 18, then control is passed to bus size valid state 402 and another read cycle is initiated. If the data transfer for the channel is complete, as indicated by an active CNL DONE signal, then control is passed to execution complete state 410. At execution complete state 410, the contents of the control circuits of control signal generator 102 are updated, the DONE signal is activated and control is passed back to idle state 400, and thus back to supervisory state machine 302. If more data is to be read from the I/O device, then control is returned to read state 402 and the process is repeated.

For a memory to I/O transfer, which is indicated by the mode information which is stored in mode controller 124, the transfer is similar to that of an I/O to memory transfer. Executory state machine 304 uses the FIFO enabled portion and transfers control to bus size valid read state 402. Data information is read from the memory device at the beginning of the cycle. While waiting for the BSV signal to go active, look ahead circuits 142, 144, 146 of look ahead circuit 103 are receiving information from the control circuits of control signal generator circuit 102 and generating control information which will be provided to the control circuits of control signal generator circuit 102 and execution state machine 304 based upon the width of the memory device as indicated by the BS16 and BS32 signals. When the BSV signal goes active, the control circuits of control signal generator circuit 102 are updated and control is passed to ready read state 404. Control cycles between bus size valid read state 402 and ready read state 404 until FIFO register circuit 104 is filled with data information.

When the RDY signal goes active in conjunction with an active BURST signal, data information is read from memory and control is passed to bus size valid write state 406. During bus size valid write state 406, for a memory to I/O transfer, control information is generated by look ahead circuit 103 while waiting for bus size information from I/O bus 18. Accordingly, when the BSV signal goes active, control can be passed to ready write state 408 and the data information which is held in FIFO register circuit 104 can be written to the I/O device 19. Data information is written to the I/O device 19 until FIFO register circuit 104 is empty. FIFO register circuit 104 is empty if there is not enough data remaining in FIFO register circuit 104 to complete an I/O transfer. At this point control is either passed to bus size valid read state 402 or to execution completion state 410 as with an I/O to memory transfer.

If during ready read state 404, when the RDY signal goes active, the BURST signal is inactive, indicating that the I/O device 19 may receive only one transfer (e.g., because I/O device 19 is a non-bursting device), then control is passed to bus size valid write state 412. During bus size valid write state 412, the information necessary to transfer the data information is generated by look ahead circuit 103 so that when the BSV signal is activated, control may be transferred to ready write state 414. When the RDY signal goes active, the data information is transferred to the I/O device 19 and control is passed to adjust count and address state 416. During adjust count and address state 416, the count and address which is stored in DMA transfer controller 123 are adjusted to track the residual data information which is in FIFO register circuit 104, and control is passed to execution completion state 410.

For a memory to I/O transfer, when control is passed to executory state machine 304, FIFO register circuit 104 may have data information which was received during a previous transfer cycle. There may be information in FIFO register circuit 104, for example, because the I/O device 19 is a non-bursting device which cannot receive the entire contents of FIFO register circuit 104 in a single transfer cycle. Accordingly, during a subsequent transfer cycle, it is not necessary to reload FIFO register circuit 104 and control may transfer directly from idle state 400 to bus size valid write state 406.

If, when control is passed to idle state 400 of execution state machine 302, the DMAGO signal is active while either the FIFOEN signal is inactive, indicating that FIFO register circuit 104 is not enabled or the MEMVER signal is active, indicating that a memory verify operation is enabled then the FIFO disabled portion of executory state machine 302 is used and control is passed to bus size valid read state 418. During bus size valid state 418, look ahead circuit 103 generates the control information necessary to effectuate a transfer. When the BSV signal goes active, this control information is loaded into the control circuits of control signal generator circuit 102 and control is passed to ready read state 420. Control remains with ready read state 420 while the RDY signal remains inactive. When the RDY signal goes active then, if the MEMVER signal is active, control is transferred to execution complete state 410. The memory verify operation is used to test transfer cycles without testing data integrity.

If the MEMVER signal is inactive, control is passed to bus size valid write state 422. During bus size valid write state 422, look ahead circuit 103 generates the control information necessary to write the data information which is held in FIFO register circuit 104. When the BSV signal goes active, then control is passed to ready write state 424. While the RDY signal is inactive, control remains with ready write state 424. If, when the RDY signal goes active, the BURST signal is active and at least four bytes remain in FIFO register circuit 104, then control is passed back to bus size valid write state 422 and more data information is written. If the CNL DONE signal is active in conjunction with the NO RESIDUAL signal then control is passed to execution complete state 4 10. If the CNL DONE signal is active in conjunction with the RESIDUAL signal, then control is passed to adjust count state 416. The address and count information of DMA transfer controller 123 is adjusted and control is passed to execution complete state 410.

Referring again to FIGS. 1, 3 and 4, in operation, when DMA controller 52 initiates any type of transfer, information which is to be transferred is read from a device, e.g., system memory 16, 17, and written into FIFO register circuit 104. The information which is held in FIFO register circuit 104 is then read from FIFO register circuit 104 and written to another device, e.g., an I/O device 19. Thus, a system read produces a FIFO write and a FIFO read produces a system write. Data information which is held in FIFO register circuit 104 is tracked via a read pointer and a write pointer which are generated by read pointer circuit 220 and write pointer circuit 222. The read pointer identifies where the first byte of data which is held in FIFO register circuit 104 is located, i.e., in which cell this information is held. The write pointer identifies the location where the next byte of data is written in FIFO register circuit 104. For the first byte of data which is written to FIFO register circuit 104, these two pointers are the same. For each subsequent byte of data information which is written to FIFO register circuit 104, the write pointer is incremented; the read pointer remains the same. In this way, it is possible to determine to which cell to write the next byte of data information. In addition to incrementing the write pointer, when data is written into a cell, the BYTE VALID signal for that cell is set active, thus indicating that valid data information is stored in the cell. When data information is read from FIFO register circuit 104, the read pointer is incremented with each byte of data which is read. The read and write pointers are stored in FIFO backup memory 108 along with the data information from the buffer cells.

Supervisory state machine 302 also determines whether a transfer is an initial transfer cycle, i.e., the first transfer which uses FIFO register circuit 104. If a transfer is an initial transfer, then data information is read directly from a source device rather than loading data information from FIFO backup memory 108.

If a transfer is not an initial transfer, as determined by supervisory state machine 302, then register circuit 104 is loaded from FIFO backup memory 108 prior to reading information from the source device. The BYTE VALID signals, which are stored along with the data information when FIFO register circuit 104 is backed up, are used to determine which buffer cells have data information stored in them after the data information is retrieved by FIFO register circuit 104.

For the first write to FIFO register circuit 104, the first byte of data information is written to initial stage cell 208a. The next byte of data is written to initial stage cell 208b and so on. After all four initial stage cells are written to, then the next byte of data information is written to intermediate stage cell 206a. Data may be written until all of the buffer cells of FIFO register circuit 104 contain data information, thus 20-bytes of data may be written to FIFO register circuit 104 without reading any information from it. With each byte that is written, the write pointer is incremented so that when the contents of FIFO register circuit 104 are retrieved from FIFO backup memory 108, data can be written to the next available cell. Because the data information is written directly to initial stage cells 208 (i.e., data information is loaded into the front end of the FIFO register), this data information is immediately available to be read from FIFO register circuit 104. Accordingly, a FIFO write and a FIFO read can occur in subsequent cycles.

The read pointer is used to track where the initial read should occur, e.g., for the initial read, the read pointer points to initial stage cell 208a. With each read, the read pointer is incremented. Accordingly, if during the initial cycle, two bytes were read and then the contents of FIFO register circuit 104 were stored in FIFO backup memory 108, then read pointer would point to initial stage cell 208c when FIFO register circuit 104 is reloaded from FIFO backup memory 108.

Data out steering controller 224 determines which multiplexer of output steering multiplexers 210 pass which bytes of data. For example, for an initial read, multiplexer 210 passes the data information which is received from initial stage cell 208a. For a read where read pointer is pointing to initial stage cell 208c, multiplexer 210 passes the data information which is received from initial stage cell 208c.

Referring again to FIG. 5, byte valid control circuit 250 determines the state of the BYTE VALID signal, and thus controls whether the information which is stored in a buffer cell is interpreted as valid information. In this way, the byte valid control circuits control shifting data information across rows of FIFO register circuit 104.

For an initial stage cell 208, when the BYTE VALID signal is inactive and a write operation is performed, then the next value of the BYTE VALID signal is active. When the BYTE VALID signal is active and a write operation is performed, then the next value of the BYTE VALID signal is active. When the BYTE VALID signal is inactive and a read operation is performed, then the next value of the BYTE VALID signal is inactive. When the BYTE VALID signal is active and a read operation is performed, then the next value of the BYTE VALID signal is BV(I−1).

For an intermediate stage cell 206, when the BYTE VALID signal is inactive and a write operation is performed, then the next value of the BYTE VALID signal is the BV(I+1) value. When the BYTE VALID signal is active and a write operation is performed, then the next value of the BYTE VALID signal is active. When the BYTE VALID signal is inactive and a read operation is performed, then the next value of the BYTE VALID signal is inactive. When the BYTE VALID signal is active and a read operation is performed, then the next value of the BYTE VALID signal is BV(I−1).

For a final stage cell 204, when the BYTE VALID signal is inactive and a write operation is performed, then the next value of the BYTE VALID signal is BV(I+1). When the BYTE VALID signal is active and a write operation is performed, then the next value of the BYTE VALID signal is active. When the BYTE VALID signal is inactive and a read operation is performed, then the next value of the BYTE VALID signal is inactive. When the BYTE VALID signal is active and a read operation is performed, then the next value of the BYTE VALID signal is inactive.

OTHER EMBODIMENTS

Other embodiments are within the following claims.

For example, FIFO register circuit 104 may be modified to include five intermediate cell columns to provide a FIFO register circuit which is 32 bytes wide, thus providing an optimal size for aligning 16 byte packets of information.

For example, FIFO register circuit 104 may be configured to allow simultaneous writes and read by modifying the register circuit with dual ports.

What is claimed is:

1. Data storage apparatus for a data handling system comprising:

storage circuitry including a plurality of cells for holding said data, each of said plurality of cells including a cell multiplexer and cell control circuit dedicated exclusively to the respective cell for selecting data to be stored in the respective cell, input steering circuitry common to all of said cells for receiving the data to be stored in said apparatus and providing the data to said cell multiplexers of individual said cells, output steering circuitry for retrieving the data from some of said plurality of cells and providing said data from some of said plurality of cells to said system, and control circuitry common to all of said cells, said common control circuitry providing control information to said input steering circuitry, said output steering circuitry and said cell control circuits to control the routing of data received by said input steering circuitry into and out of said cells, as well as between said cells, said control circuitry conditioning said cell control circuits of individual said cells to route data into and out of said apparatus on a first in, first out basis.

2. Data storage apparatus of claim 1 wherein said plurality of cells are arranged in an containing rows of plural cells and columns of plural cells, and the number of said rows and columns respectively determine the depth and width of said array; wherein the width of said array establishes the maximum sized set of data bits which can be transferred out of said array in parallel, and the depth of said array determines the total number of maximum sized sets of data bits which can be stored in said array.

3. The apparatus of claim 2 wherein said storage circuitry includes an initial column of cells, a last column of cells, and an intermediate column of cells, and the data first received by said input steering circuitry when all of said cells are empty is first stored only in cells in said initial column of cells.

4. The apparatus of claim 3 wherein the data received by said input steering circuitry is stored in cells in said intermediate column of cells only after said initial column of cells has been loaded with data.

5. The apparatus of claim 4 wherein the data received by said input steering circuitry is stored in cells in said last column of cells only after cells in said first and intermediate columns of cells have been loaded with data.

6. The apparatus of claim 5 wherein said storage circuitry includes a plurality of columns of intermediate cells.

7. The apparatus of claim 6 wherein each said cell holds one byte of data.

8. The apparatus of claim 7 wherein said storage circuitry includes four rows of cells to provide a 32-bit wide storage circuit.

9. The apparatus of claim 7 wherein said storage circuitry includes eight rows of cells to provide a 64-bit wide storage circuit.

10. The apparatus of claim 6 wherein said storage circuitry includes three columns of intermediate cells.

11. The apparatus of claims 6 wherein said storage circuitry includes five columns of intermediate cells.

12. Apparatus in accordance with claim 2 wherein:

data to be stored in said apparatus is applied to said multiplexer circuits in each of a plurality of said cells; said data originating at a plurality of sources;

the sources of data applied to the multiplexer circuits of the cells in a final column of cells include outputs from cells an intermediate column of cells; and the sources of data applied to the multiplexer circuits of the cells in said intermediate column of cells include outputs from cells of an initial column of cells.

13. The apparatus of claim 1 wherein said control information includes read information for determining when data stored in individual said cells is to be read out of respective cells.

14. The apparatus of claim 1 wherein said control information includes write information for determining on a cell by cell basis which cells are to receive and store data.

15. The apparatus of claim 1 wherein said control information determines which information is passed by individual said cell multiplexers into respective said cells.

* * * * *